US010463969B2

(12) United States Patent
Archer et al.

(10) Patent No.: US 10,463,969 B2
(45) Date of Patent: Nov. 5, 2019

(54) MAINTAINING COMMUNICATIONS INTEGRITY OF NETWORK-BASED USER INTERACTIONS

(71) Applicant: Verizon Patent and Licensing Inc., Arlington, VA (US)

(72) Inventors: Steven T. Archer, Dallas, TX (US); Robert Stewart, Point Pleasant, NJ (US); Vikas B. Patel, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 15/935,508

(22) Filed: Mar. 26, 2018

(65) Prior Publication Data
US 2019/0291009 A1    Sep. 26, 2019

(51) Int. Cl.
*H04L 29/06* (2006.01)
*A63F 13/75* (2014.01)
*H04L 12/26* (2006.01)
*H04L 12/801* (2013.01)

(52) U.S. Cl.
CPC .......... *A63F 13/75* (2014.09); *H04L 43/0882* (2013.01); *H04L 43/12* (2013.01); *H04L 47/19* (2013.01); *H04L 63/0884* (2013.01); *H04L 63/1441* (2013.01); *H04L 67/38* (2013.01)

(58) Field of Classification Search
CPC ..... A63F 13/75; H04L 43/0882; H04L 43/12; H04L 47/19
USPC ........................................................ 709/224
See application file for complete search history.

(56) References Cited

U.S. PATENT DOCUMENTS

| 9,521,162 B1 * | 12/2016 | Zand ................... H04L 63/1441 |
| 2017/0126476 A1 * | 5/2017 | Curtin ................. H04L 41/0631 |
| 2017/0186019 A1 * | 6/2017 | Loeb ................... G07F 17/3227 |

* cited by examiner

*Primary Examiner* — Glenford J Madamba

(57) ABSTRACT

Systems and methods monitor data communications transmitted in a provider network connecting a first user device to at least one of a second user device or a network-based application host; determine that the data communications are associated with an active data session based on the monitoring; obtain current attribute values for the data communications; apply a set of rules that define a plurality of compromised communications states as a function of reference attribute values that correspond to the current attribute values; evaluate the current attribute values against the set of rules to determine a compromised communications state with respect to the user-interactive data session; implement, based on the compromised communications state, at least one compensating efficiency with respect to the data communications transmitted via the provider network during the user-interactive data session.

20 Claims, 7 Drawing Sheets

| Attribute Features | Description |
|---|---|
| Ctxt_Drop% | Context Drop Rate |
| Ctxt_Setup_Fail% | Context Setup Failure Rate |
| RRC_Drop% | RRC Drop Rate |
| RRC_Connection_Fail% | RRC Failure Rate |
| HO_Fail% | Handover Failure Rate |
| RRC_Conn_Blk% | RRC Connection Block Rate |
| RRCUsers_AvgConnected | Average Number of RRCs in Connected Mode |
| Total_ERAB_SF% | Total Eutran Radio Access Bearer Service Failure Rate |
| Default_ERAB_Brr_SF% | Default Eutran Radio Access Bearer Service Failure Rate |
| Ded_ERAB_Brr_SF% | Dedicated Eutran Radio Access Bearer Service Failure Rate |
| Total_ERAB_Brr_Drop% | Total Eutran Radio Access Bearer Drop Rate |
| Ded_ERAB_Brr_Drop% | Dedicated Eutran Radio Access Bearer Drop Rate |
| DL_Init_BLER% | Downlink –Initial Block Error Rate |
| DL_RLC_ReTx% | RLC Retransmission Rate -Downlink |
| DL_Resid_BLER% | Downlink Residual Block Error Rate |
| L1_UL_Thpt | L1 Throughput-Downlink |
| L1_DL_Thpt | L1 Throughput-Uplink |
| UL_Init_BLER% | Uplink Initial Block Error Ratio |
| UL_Resid_BLER% | Uplink Residual Block Error Ratio |
| PRB_Util_DL_15min_Pct | Physical Resource Block Utilization –Downlink |
| PRB_Util_UL_15min_Pct | Physical Resource Block Utilization –Uplink |
| DL_TotalEutranRadio | Access Bearer Drop Rate |
| DL RLC_Delay(ms) | Downlink RLC Delay in ms |
| RTT (Calculated) | Application Layer Round Trip Time |

MAINTAINING COMMUNICATIONS INTEGRITY OF NETWORK-BASED USER INTERACTIONS

BACKGROUND INFORMATION

Online (web), cloud, and network-enabled user interactions (e.g., software- and dedicated device-based gaming, etc.) have experienced continued growth and competition. Mobile, app-based gaming, for example, has also seen a steady increase in popularity. As the competitiveness in multiplayer gaming escalates, so too do users' actions that are generally considered by the gaming community as giving an unfair competitive advantage to one competitor over the other(s). Although the extent of such illegitimate gameplay is unknown, the use of cheat methodologies (e.g., "lag switches," "Bots," and "Scripting," etc.) and third-party malicious attacks (e.g., temporary denial of service (DoS)) against competitors' IP addresses—which have the intended effect of disrupting and/or manipulating data flow—is clearly on the rise. Presently, game developers and gaming hosts are limited in their abilities to combat most unfair gameplay practices, which negatively impacts growth of the industry.

BRIEF DESCRIPTION OF THE DRAWINGS

FIG. 5 is a list of exemplary input attributes used in the gaming equality system of FIG. 4;

DETAILED DESCRIPTION OF PREFERRED EMBODIMENTS

Figure 1:
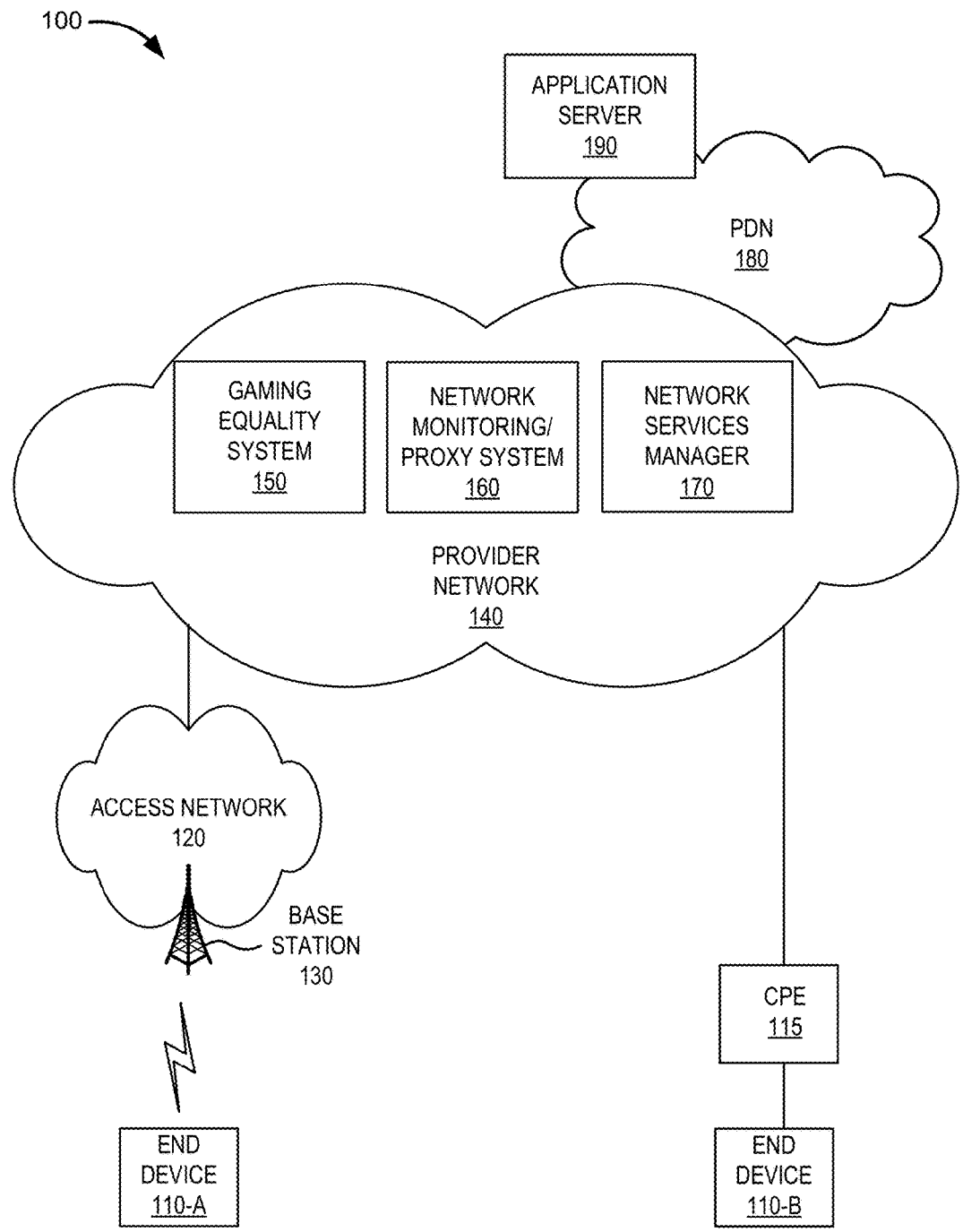
FIG. 1 is a diagram illustrating a network environment in which systems and methods described herein may be implemented.

The following detailed description refers to the accompanying drawings. The same reference numbers in different drawings identify the same or similar elements.

Many cheating tactics that are prevalent in network-enabled gaming are implemented for and have the effect of compromising—via manipulation and/or interruption—data communications of the client device(s) used by the cheater and/or one or more other players. Gaming applications executing on networked client devices typically do not have end-to-end channel performance information for the network. An Internet service provider (ISP) that carries gaming traffic is thus uniquely positioned to leverage deployed networks, infrastructure, and technologies in implementing real-time and/or scheduled optimized data communication service to enable/ensure fair competition in multiplayer gaming environments. Effective anti-cheating techniques for evening communication opportunities for gaming opponents can positively impact gamers' experience by maintaining the integrity of individual game outcomes and the gaming industry overall.

Although no snapshot of a single key performance indicator (KPI) can definitively point to a specific dataflow manipulation/interruption event during an active gaming session, end-to-end channel performance information that is available to an ISP's traffic management systems may include factors contributing to congestion, latency issues, irregular IP packet behavior, etc., which may relate to a compromised communications (e.g., gaming) state. Over time, multiple types of KPI data observed for the provider network, the gaming service, and/or client device(s) may, upon analysis, identify baseline/reference performance values for evaluating real-time KPI values for an active gaming session. Deviations (distinguished from anomalies) from the baseline/reference values may be used to detect gaming trends and/or network patterns that are indicative of deliberately-caused disparities in the end-to-end channel communications of one or more players due to, for example, DoS attacks, use of lag switches, Bots, scripting, IP spoofing, or other types of malicious activity intended to interrupt network connectivity for one or more competitors during an active gaming session.

Systems and methods described herein may use a number of different types of KPI data to evaluate end-to-end data communications opportunities during a user-interactive data session. Compromised end-to-end channel communications may relate to degradation or a trend toward transmission disorder in network communication channels between an end device and a server and/or between two or more end devices, and amount to a competitive advantage in favor of one player over another. Each network KPI attribute carries some information of data flow conditions (e.g., delays, congestion, and utilization) that impact channel capacity/performance. Observed KPI values may be processed by a machine learning system and correlated to relative compromised communications conditions during a gaming session. KPI data and network and/or application parameters and communication protocols may be used to optimize network performance responsive to the compromised gaming conditions.

In one embodiment, KPI attribute values for an active gaming protocol/application session may be applied to determine channel performance/capacity conditions (such as application layer round trip time (RTT) or burst rates), and provide the conditions to the protocol, application, and or network management systems. The management systems may then dynamically and/or automatically adjust throughput (e.g., transmission control protocol (TCP) throughput, send window size, etc.) and/or use communication tools (e.g., compression) to optimize available channel capacity (e.g., for real-time transmission rate equalization), for example, to improve network efficiencies, and increase bandwidth and overall network capacity for a user device used by a disadvantaged player. In an embodiment described herein, the management systems may, in conjunction with self-optimizing tools, ensure an advantage neutral network performance relative to multiple end users, for example.

According to one gaming equality solution described herein, a network device may monitor data communications transmitted in a provider network connecting a first user device to at least one of a second user device or a network-based application provider. The network device may determine, based on the monitoring, that the data communications are associated with a user-interactive data session, and obtain current attribute values for the data communications.

The network device may apply a set of rules that define a plurality of compromised communications states as a function of reference attribute values that correspond to the current attribute values and evaluate the current attribute values against the set of rules to determine a compromised communications state with respect to the user-interactive data session. The network device may implement, based on the compromised communications state, at least one compensating efficiency with respect to the data communications transmitted via the provider network during the user-interactive data session. In this manner, the compromised communications state may be managed toward a non-compromised communications state to negate any unfair competitive advantage and balance communications opportunities among participants.

FIG. 1 is a diagram of an exemplary network environment 100 in which systems and/or methods, described herein, may be implemented. As shown in FIG. 1, network environment 100 may include end devices 110-A and 110-B (generically "end device 110"), customer premises equipment (CPE) 115, access network 120, a provider network 140, a packet data network (PDN) 180, and an application server (or "gaming service") 190. End device 110-A may connect to provider network 140 via access network 120, and end device 110-B may connect to provider network 140 via CPE 115, for example, through a wired connection. End device 110-A may establish a communication session with end device 110-B via access network 120, provider network 140, and CPE 115. In other implementations, end device 110-A may establish a communication session with another type of device, such as application server 190 and/or another end device 110 connected, for example, directly to PDN 180.

In some implementations, end device 110 may include a handheld wireless communication device (e.g., a mobile phone, a smart phone, a phablet device, etc.); a wearable computer device (e.g., a head-mounted display device, a head-mounted camera device, an interactive wristwatch device, etc.), a laptop computer, a tablet computer, or another type of personal computer and/or any other type of computer device with wireline and/or wireless communication capabilities; a media playing device; a virtual reality device, an augmented reality device, a simulator, and/or a gaming console/system.

CPE 115 may include a network access point (AP), such as a modem, a router, a gateway, and/or any other device capable of connecting end device 110-B via a data communication protocol to provider network 140 and/or PDN 180. In one implementation, CPE 115 may communicate with provider network 140 and/or PDN 180 using IPv4, IPv6, and/or other routing protocols.

Access network 120 may include one or multiple networks of one or multiple types. For example, access network 120 may be implemented to include a terrestrial network, a satellite network, a wireless network, and/or a wired network. According to an exemplary implementation, access network 120 includes a radio access network (RAN) as defined by standards governing entities, such as the Third Generation Partnership Project (3GPP) or the International Telecommunication Union (ITU). The RAN may be a Third Generation (3G) RAN, a Fourth Generation (4G) RAN, a 4.5G RAN, a future generation wireless network architecture (e.g., a Fifth Generation (5G) RAN), etc. By way of further example, access network 120 may include an Evolved Universal Mobile Telecommunications System (UMTS) Terrestrial Radio Access Network (E-UTRAN) of a Long Term Evolution (LTE) network or LTE-Advanced (LTE-A) network, a U-TRAN, a UMTS RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like.

Depending on the implementation, access network 120 may include various network elements, such as base stations 130, a Node B, an evolved Node B (eNB), a base station controller, a radio network controller (RNC), a femto-device, a pico-device, a home eNB, a relay node, a wireless access point, or other type of wireless node that provides wireless access. Access network 120 may include a wired network. For example, access network 120 may include an optical network or a cable network.

According to an implementation, base station 130 may be part of an LTE eNodeB base station device. An eNodeB base station device may use the Evolved Universal Terrestrial Radio Access (E-UTRA) air interface to wirelessly communicate with devices. An eNodeB base station device may include one or more devices (e.g., base station 130) and other components and functionality that allow end device 110 to wirelessly connect to access network 120.

Provider network 140 may be managed, at least in part, by a provider of communication services associated with access network 120. Provider network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, a private network, a public network, or a combination of networks.

According to an implementation, provider network 140 may include a core network. The core network may include a complimentary network pertaining to the one or multiple RANs described above. For example, the core network may include the core part of an LTE network, an LTE-A network, etc. Depending on the implementation, the core network may include various network elements, such as a gateway, a support node, a serving node, a router, a switch, a bridge, as well other network elements pertaining to various network-related functions, such as billing, security, authentication and authorization, network policies, subscriber profiles, etc.

Provider network 140 may allow the delivery of Internet Protocol (IP) services to end device 110, and may interface with other external networks, such as PDN 180. In some implementations, provider network 140 may include an Internet Protocol Multimedia Subsystem (IMS) network (not shown in FIG. 1). An IMS network may include a network for delivering IP multimedia services as specified by 3GPP or other standards/protocols and may provide media flows between end device 110 and external IP networks or external circuit-switched networks (not shown in FIG. 1). Provider network 140 may include one or more server devices and/or network devices, or other types of computation or communication devices to manage the functionality of provider network 140, and provide the gaming equality service as described herein. For example, provider network 140 may include a gaming equality system 150, a network monitoring/proxy system 160, and/or a network services manager 170.

Gaming equality system 150 may include one or more devices, such as computer devices and/or server devices, which analyze various key performance indicator ("KPI") data that impact end-to-end network communications (e.g., between end device 110 and application server 190 and/or between end devices 110). According to an implementation, gaming equality system 150 may receive KPI data from multiple interfaces/devices within network environment 100 (e.g., RAN interfaces such as E-UTRA air interfaces and S-1 interfaces) that are in the end-to-end patch of an active gaming session.

In some embodiments, gaming equality system 150 may apply machine learning to derive the protocols and/or applications delays, identify the attributes impacting dataflow and utilization of a protocol/application session and generate context-sensitive traffic optimization guidelines for the corresponding protocol and application. In one embodiment, gaming equality system 150 may identify KPI values that correlate to end-to-end network conditions (such as delay, latency, jitter, burstiness, etc.). Gaming equality system 150 may use machine learning to identify an interrelationship between KPI values and different network conditions, identify benchmark KPI values, and assess network behavior based on a comparison of the KPI values to the established baseline KPI values.

Network monitoring/proxy system 160 may include one or more devices, such as computer devices and/or server devices, which monitor, collect, manage, and/or maintain network management information related to provider network 140. In an embodiment, network monitoring/proxy system 160 may monitor and collect many different types of KPI data, such as latency information, various drop rates, different error rates, etc., for provider network 140. For example, network monitoring/proxy system 160 may maintain historical and/or current latency data for particular links and/or devices in provider network 140.

Additionally or alternatively, network monitoring/proxy system 160 may obtain KPI data for particular communication channels (e.g., a physical or logical connection over a multiplexed medium), sessions, and/or for a particular gaming communication session. In some embodiments, network monitoring/proxy system 160 may obtain information pertaining to network attributes such as location information, time-to-live (TTL) analyses, network time protocol (NTP) protection, domain name system (DNS) protection, packet loss, delay, lag, jitter, central processing unit (CPU) utilization, memory space utilization, port utilization, QoS/traffic prioritization (e.g., audio, video, VoIP, etc.), multicast data, etc. Network monitoring/proxy system 160 may store KPI data and other attributes for retrieval by gaming equality system 150.

In one embedment, network monitoring/proxy system 160 may monitor, collect, manage, and/or maintain KPI data and other attributes related to application server 190. For example, network monitoring/proxy system 160 may determine state changes, anomalies, gaming trends, and/or network patterns with respect to one or more of NTP, network communications, CPU utilization, memory space utilization, etc., for application server 190, as available to network monitoring/proxy system 160 in connection with gaming sessions hosted by application server 190.

In one embedment, network monitoring/proxy system 160 may monitor, collect, manage, and/or maintain KPI data and other attributes related to end device 110. For example, network monitoring/proxy system 160 may determine baseline player behavior, operation, and/or changes with respect to one or more of NTP, network communications, game packet volumes and speeds, CPU utilization, memory space utilization, gaming software validation, device firmware validation, etc., for end device 110, as available to network monitoring/proxy system 160. In one embodiment, the type of information acquired for each end device 110 may vary, for example, based on a relationship between the end device user and the ISP. For example, ISP may have access to more information related to the operation of end device 110 in cases where end device 110 is associated with a subscriber to ISP services.

Network services manager 170 may include one or more devices, such as computer devices and/or server devices, which perform traffic management functions for provider network 140. Network services manager 170 may also maintain and/or manage service requirements information for provider network 140. For example, network services manager 170 may store service requirement information, including latency requirements, for particular service types (e.g., Quality of Service (QoS) class, sessions associated with a particular application, sessions associated with a particular communication protocol, etc.).

Network services manager 170 may adjust throughput settings in access network 120 and/or provider network 140 based on end-to-end latency and based on the service requirements associated with particular service types. In one implementation, network services manager 170 may include a self-optimizing network (SON) system for provider network 140. In another implementation, network services manager 170 may include a TCP/video optimization service or another type of traffic management system for provider network 140. In some embodiments, network services manager 170 may select communication tools such as data compression and/or one or more networking efficiencies such as least cost routing, RAN acceleration (e.g., LTE-assisted access (LAA), carrier aggregation, etc.), software-defined networks (SDNs), tunneling, edge computing, traffic prioritization, packing caching, etc., for implementation, which corresponds to the particular network condition.

PDN 180 may include any type of wired or wireless network covering relatively expansive areas. For example, PDN 180 may include a metropolitan area network (MAN), a Public Switched Telephone Network (PSTN), an ad hoc network, an intranet, the Internet, a fiber optic-based network, a wireless network, and/or a combination of these or other types of networks. PDN 180 may be an IP-based network or utilize Multi-Protocol Label Switching (MPLS), and may include a mesh network (e.g., IEEE 801.11s) and/or or a WiMAX network (e.g., IEEE 802.16). PDN 180 may include one or more circuit-switched networks and/or packet-switched networks that provide data services (e.g., via packets or any other IP datagrams).

Application server 190 may include one or more devices, such as computer devices and/or server devices, which are configured to communicate with end devices 110. For example, application server 190 may be configured to send and receive data for applications executing on end devices 110. Application server 190 may be a gaming service operating in PDN 180 or a private network (not shown in FIG. 1) that is connected to provider network 140. In other implementations, application server 190 may be a gaming service operating in provider network 140.

Although FIG. 1 shows exemplary components of network environment 100, in other implementations, network environment 100 may include fewer components, different components, differently arranged components, or additional functional components than depicted in FIG. 1. Additionally or alternatively, one or more components of network environment 100 may perform functions described as being performed by one or more other components of environment 100.

Figure 2:
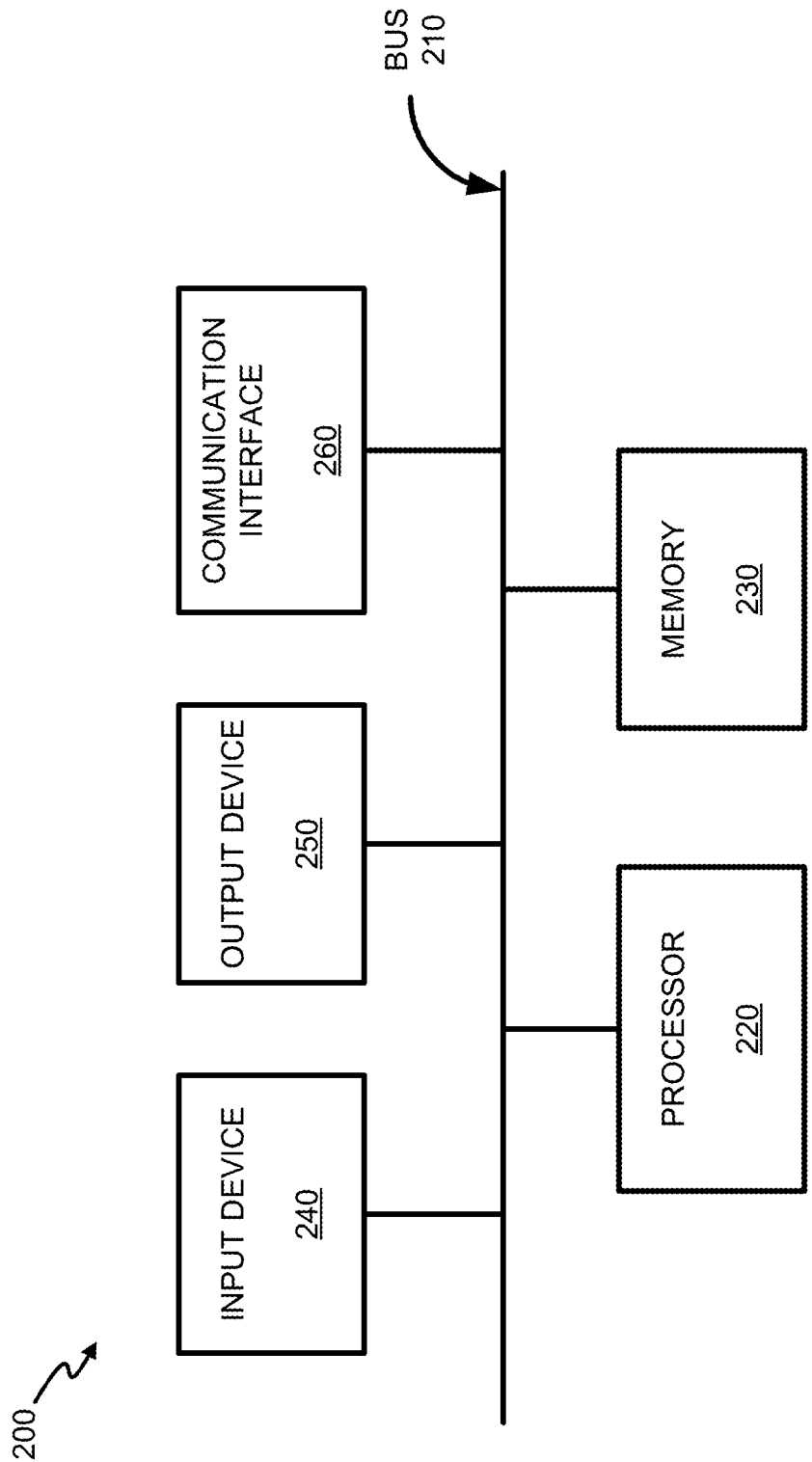
FIG. 2 is a diagram illustrating exemplary components of a device that may be included in a device of FIG. 1.

FIG. 2 is a diagram illustrating exemplary components of device 200 according to an implementation described herein. End devices 110, base station 130, gaming equality system 150, network monitoring/proxy system 160, network services manager 170, and/or application server 190 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. That is, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. That is, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals. If device 200 is included in end device 110 or base station 130, for example, communication interface 260 may include an antenna assembly.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a Wi-Fi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to providing network integrity in network-based gaming. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may include an algorithm and/or rules that may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
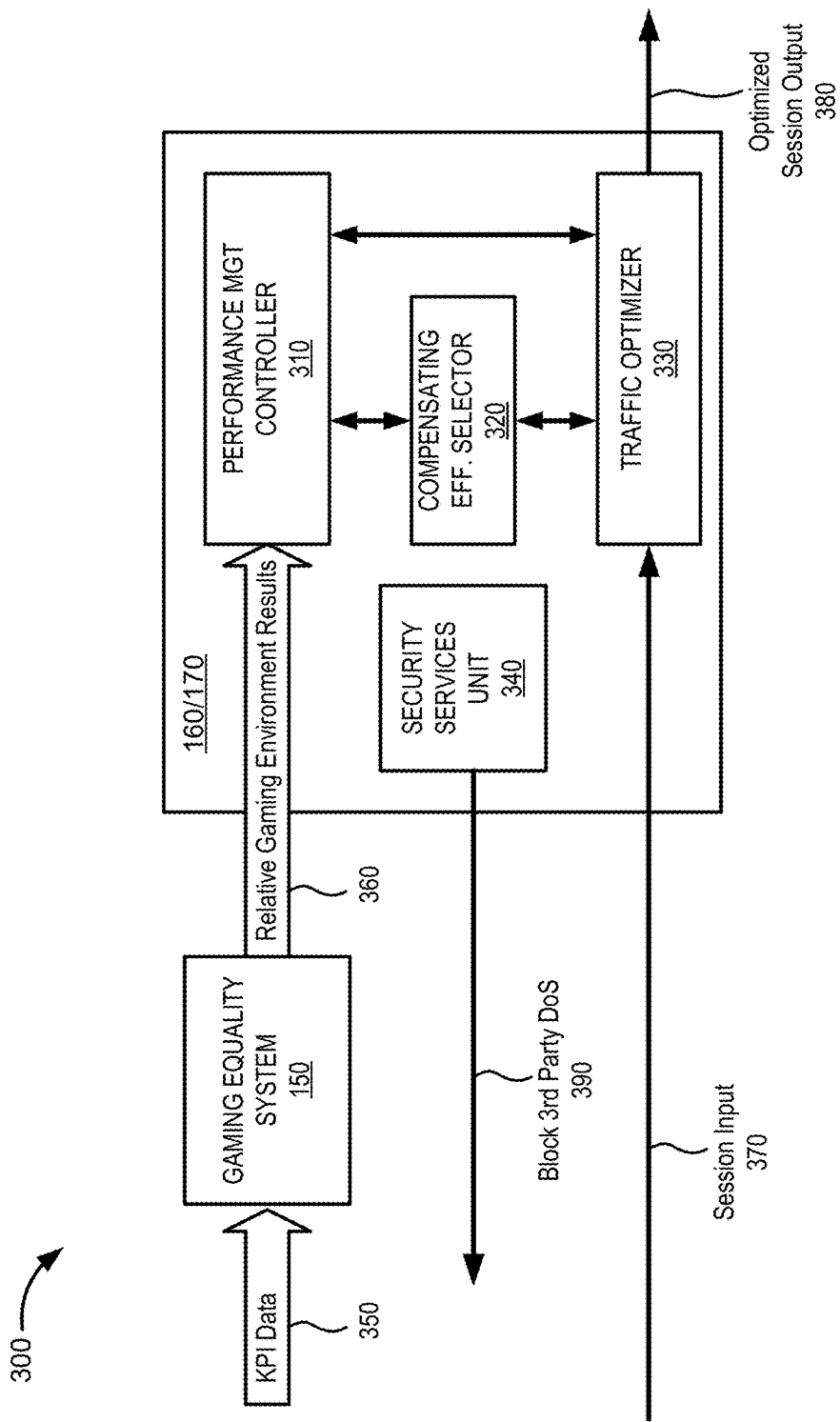
FIG. 3 is a block diagram illustrating exemplary communications and logical components in a portion of the network environment of FIG. 1.

FIG. 3 is a block diagram illustrating exemplary communications and logical components in a portion 300 of network environment 100. The functions described in connection with FIG. 3 may be performed by one or more components of device 200 (FIG. 2) (e.g., processor 220). As shown in FIG. 3, network portion 300 may include gaming equality system 150, network monitoring system 160, and network services manager 170. Logical components in network monitoring system 160 and/or network services manager 170 may include a performance management controller 310, a compensating efficiency selector 320, a traffic optimizer 330, and/or security services unit 340.

As shown in FIG. 3, KPI data 350 may be provided to gaming equality system 150. As described further herein, gaming equality system 150 may generate and tune models to calculate relative gaming environment results 360. Relative gaming environment results 360 may indicate attributes that relate to a compromised gaming state and may be based on, for example, application layer (e.g., TCP/IP application layer) round trip time (RTT) or burst rates (e.g., burst density or burst duration) for data transmissions during active gaming sessions.

Relative gaming environment results 360 may be provided, for example, to performance management controller 310. Performance management controller 310 may apply performance information to relative gaming environment results 360, and forward the combined information (e.g., as gaming state data) to compensating efficiency selector 320 and gaming traffic optimizer 330. In one embodiment, the gaming state data may indicate (qualitatively and/or quantitatively) that current gaming conditions are disparate among the players, which disparity exceeds a predetermined threshold level. The gaming state data may identify the offending user/end device 110, the victim(s)/end device(s) 110, and/or a third-party attacker/end device 110. The gaming state data may identify the malicious attack (e.g., DoS, etc.), cheat methodology (e.g., lag switch, Bot, scripting, etc.), and/or other actionable gameplay (e.g., IP spoofing, player profile hacking/spoofing, world-hacking, etc.).

Compensating efficiency selector 320 may receive gaming state data from performance management controller 310 and select, based on the type of compromised gaming state, one or more compensating efficiency from a plurality of compensating efficiencies to counteract the compromised gaming state. As mentioned, compensating efficiencies may include communication tools (e.g., data compression) and networking efficiencies (e.g., least cost routing, RAN acceleration (e.g., LAA, carrier aggregation, etc.), tunneling, SDNs, edge computing, traffic prioritization, packing caching).

Traffic optimizer 330 may receive session input 370 from, for example, application server 190 and/or end device 110. Traffic optimizer 330 may apply to session input 370, TCP optimization, smart pacing (e.g., video pacing or other data pacing), user datagram protocol (UDP) optimization, or other optimization techniques based on the compensating efficiency selected by compensating efficiency selector 320 and information from performance management controller 310. After optimization, traffic optimizer 330 may provide optimized session output 380 toward the destination (e.g., end device 110 and/or application server 190, etc.).

Security services controller 340 may perform third-party malicious activity detection and select and enable one or more security policies to identify, allow, block, or limit DoS packets targeting, for example, the public IP address of one or more end device 110. For example, security services controller 340 may use gaming state data received from performance management controller 310 to identify the source (e.g., IP address) of malicious (e.g., DoS) attacks targeting (using the public IP address) one or more participants of the active gaming session. In one embodiment, security services controller 340 may enable ad hoc security tools such as firewalls, virtualized services, etc., to block malicious activity 390 from a third-party end device 110 (on behalf of the offending player).

Figure 4:
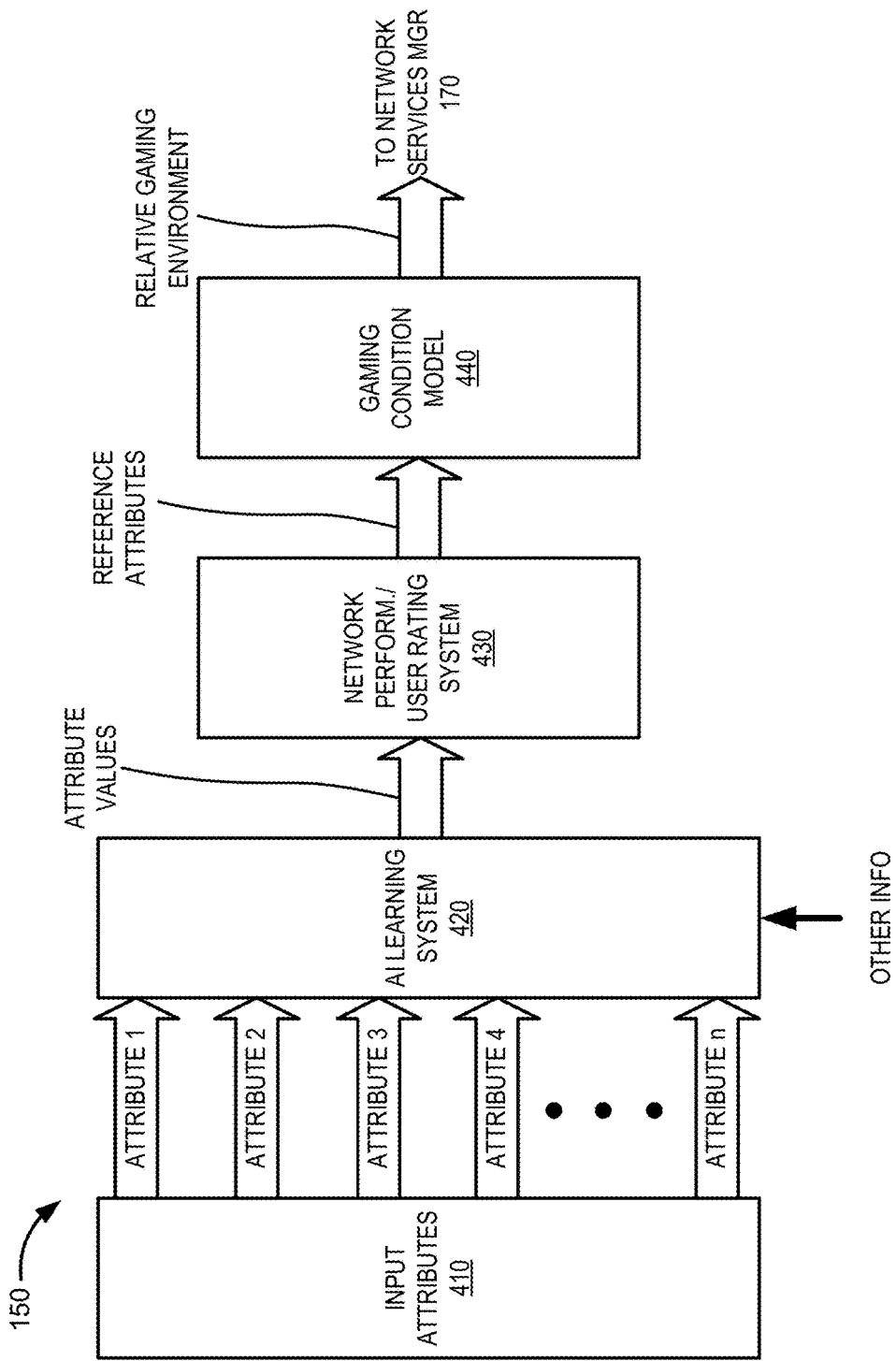
FIG. 4 is a block diagram illustrating exemplary communications and logical components of the gaming equality system of FIG. 1.

FIG. 4 is a block diagram illustrating exemplary communications and logical components of gaming equality system 150. As shown in FIG. 4, gaming equality system 150 may include input attributes 410, AI learning system 420, network performance/user rating system 430, and gaming condition model 440.

Input attributes 410 may include a number of attributes selected for inclusion in a channel performance analysis. Input attributes may include, for example, performance indicators for access network 120 and/or provider network 140. Input attributes 410 may be selected by a system administrator or generated using an automated feature selection technique. Input attributes 410 may generally include measurable performance indicators for transmission of data via a network. In some cases, input features 410 may include multiple (e.g., hundreds, thousands, etc.) measurable performance indicators. FIG. 5 is a list of exemplary input attributes 410 from which attributes 1-$n$ may be used in gaming equality system 150.

Referring to FIG. 5, input attributes 410 may include measurable attributes for a RAN (e.g., access network 120). In other implementations, input attributes 410 may include attributes (e.g., KPIs) from multiple different networks of an end-to-end connection in a peer-to-peer multiplayer gaming model and/or a client-server gaming model. Input attributes 410 may include, for example, Context Drop Rate, Context Setup Failure Rate, Radio Resource Control (RRC) Drop Rate, RRC Failure Rate, Handover Failure Rate, RRC Connection Block Rate, Average Number of RRCs in Connected Mode, Total EUTRAN Radio Access Bearer Service Failure Rate, Default EUTRAN Radio Access Bearer Service Failure Rate, Total EUTRAN Radio Access Bearer Drop Rate, Dedicated EUTRAN Radio Access Bearer Drop Rate, Downlink—Initial Block Error Rate, radio link control (RLC) Retransmission Rate—Downlink, Downlink Residual Block Error Rate, Layer 1 (L1) Throughput-Downlink, L1 Throughput-Uplink, Uplink Initial Block Error Ratio, Uplink Residual Block Error Ratio, Physical Resource Block Utilization—Downlink, Physical Resource Block Utilization—Uplink, Access Bearer Drop Rate, Downlink RLC Delay (in milliseconds), and Application Layer Round Trip Time. It is to be understood that FIG. 5 is only a small representation of the various input attributes 410 of the prospective measurable or calculable indicators available for communication analytics.

Returning to FIG. 4, input attributes 410 may be used in an AI learning system 420 to identify specific attributes and determine values for the identified attributes. AI learning system 420 may apply machine learning to generate values for KPIs for provider network 140, end device(s) 110, and/or application server 190. Attribute values may be determined, for example, for RTT, latency, dropped packets, physical resource block utilization (PRBU) and other KPIs, and forwarded to network performance/user rating system 430. AI learning system 420 may forward select attributes to network performance/user rating system 430. In some embodiments, other information may be fed into AI learning system 420 including, for example, network traffic information that is destined for one or more end device 110 that does not originate from application server 190 or any end device 110 associated with the gaming session. Such information may be used as described herein to identify malicious activity of a non-participant third party targeting one or more of the actual players.

Network performance/user rating system 430 may determine reference values corresponding to the attribute values received from AI learning system 420. Reference values may define baseline performance for communications for gaming sessions over provider network 140, gaming sessions involving end device 110, gaming sessions for application server 190, gaming sessions using the identified protocols, gaming sessions for the particular identified game, etc. According to an implementation, the reference values define norms for performance criteria based on stored values for previous gaming sessions monitored by gaming equality system 150. In one implementation, the reference values are particular to the identified end devices, players, particular game, etc. Network performance/user rating system 430 may forward select attribute values and corresponding reference values to gaming condition model 440.

In one embodiment, network performance/user rating system 430 may maintain a player (and/or group) rating system that may include profiles and/or rankings of participants for particular games. Network performance/user rating system 430 may maintain one or more lists identifying IP addresses, for example, of cheaters (e.g., blacklists), victims, and/or third-party attackers/hackers. Network performance/user rating system 430 may use time of day information associated with gaming session data to determine norms for reference values and/or anomalies for reference values. In some embodiments, reference values may reflect network state change information. Network performance/user rating system 430 may use location information for end devices 110 to determine the reference values. Network performance/user rating system 430 may evaluate identity management authentication of players and end devices 110.

Gaming condition model 440 may receive the attribute values and corresponding reference values from network performance/user rating system 430. Gaming condition model 440 may use attribution analytics to determine whether an active gaming session is in a compromised gaming state. In some embodiments, the determination of a compromised gaming state is qualitative, for example, based on one or more thresholds (e.g., more likely than not). Gaming condition model 440 may use differences between the observed attribute values and the reference values and interrelationships between the attributes, as well as historical information regarding end device 110, provider network 140, application server 190, and the particular game, etc., in making a determination of whether a disparity in communications opportunities exist among the game's participants. In one embodiment, gaming condition model 440 may identify the cheat methodology and/or the type of third-party attack. Gaming condition model 440 may forward the relative gaming environment information to network services manager 170.

Network services manager 170 may receive the relative gaming environment information and use one or more compensating efficiencies and/or one or more ad hoc security tools to optimize traffic flow. For example, traffic optimizer 330 may leverage communication efficiencies such as compression, and or networking efficiencies such as RAN acceleration technology, to set transmission throughput for a gaming session based on the compromised gaming state (e.g., corresponding to imbalanced communication opportunities). Additionally or alternatively, security services unit 340 may enable ad hoc security tools such as firewalls and/or virtualized services to combat a third-party DoS attack, for example.

Although FIG. 4 shows exemplary components of gaming equality system 150, in other implementations, gaming equality system 150 may include fewer components, different components, additional components, or differently-arranged components than depicted in FIG. 4. Additionally or alternatively, one or more components of gaming equality system 150 may perform one or more tasks described as being performed by one or more other components of gaming equality system 150.

Figure 6:
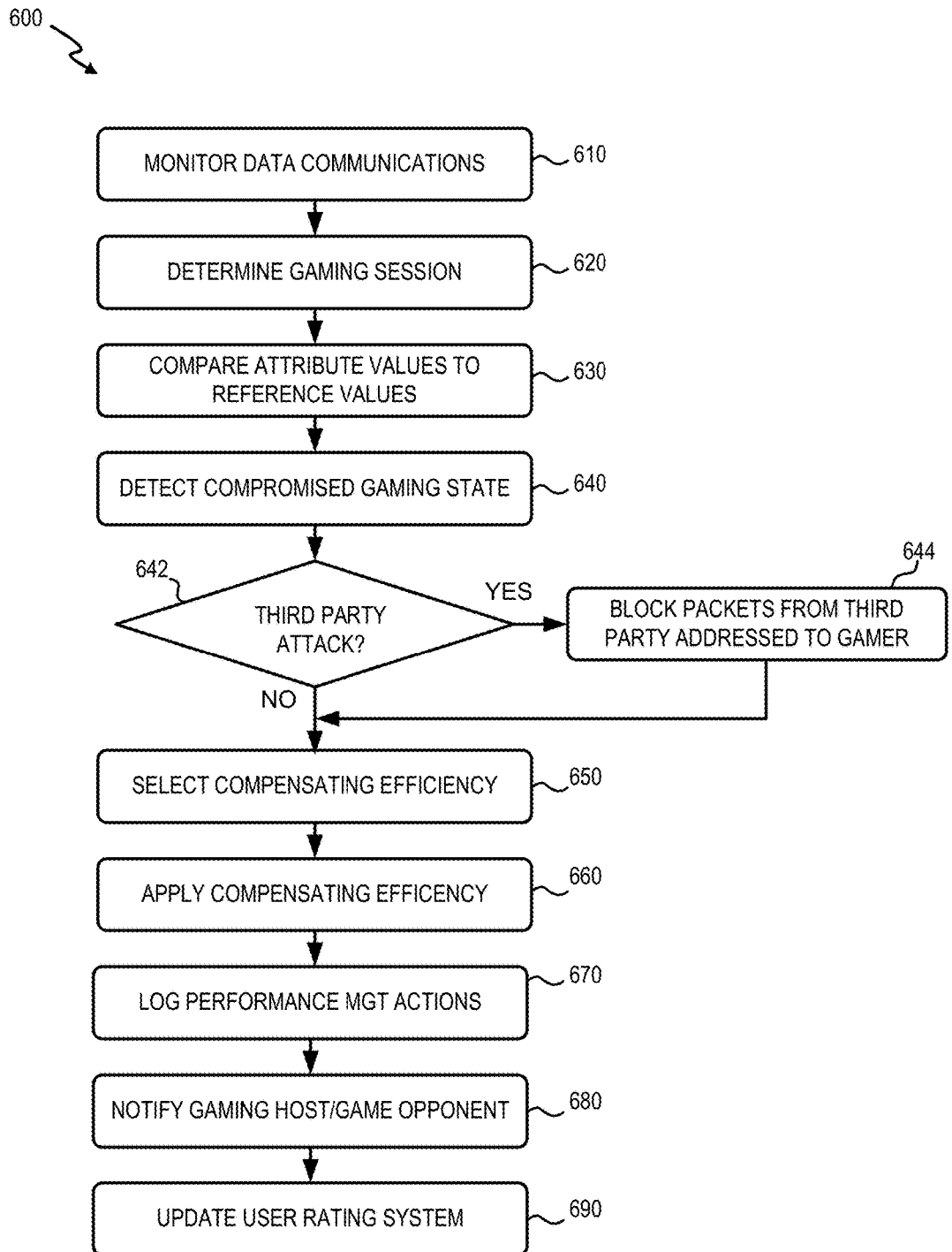
FIG. 6 is a flowchart of a process for implementing the gaming equality system as described herein.

FIG. 6 is a flow diagram illustrating an exemplary process 600 of for providing gaming equality to one or more participants during an active gaming session, according to an implementation described herein. Process 600 may be implemented by one or more gaming equality system 150 in network environment 100. In another implementation, process 600 may be implemented by gaming equality system 150 in conjunction with one or more other devices in network environment 100.

Referring to FIG. 6, process 600 may include monitoring data communications over network communication channels (block 610), determining that the data corresponds to an active gaming session (block 620), and comparing a set of attribute values to a set of reference values (block 630). For example, gaming equality system 150 may be requested by application server 190 to provide gaming equality services for a gaming session involving one or more end device 100.

Additionally or alternatively, end device 110 or other types of network devices (e.g., PGW in a core network, etc.) may invoke the gaming equality service at any point before and/or during an active gaming session. Gaming equality system 150 may examine data packets associated with the gaming session which are transmitted over provider network 140. Input attribute values for the network communication channels may be identified in a listing of KPIs (e.g., provided by a system administrator) or derived from other systems.

Process 600 may also include detecting a compromised gaming state (block 640) and determining whether the compromised gaming state includes an attack from a third party against one or more participants in the gaming session (block 642). For example, gaming equality system 150 may determine that a non-participant in the gaming session is launching a DoS attack against one or more game participants (block 642—YES). In some embodiments, gaming equality system 150 may determine that the third party is acting on behalf of (e.g., for cryptocurrency) by one of the game participants to launch the attack against an opponent. Information of the third party attack may be forwarded to security services unit 340, and security services unit 340 may enable ad hoc security tools to intercept and/or block the DoS packets from reaching the intended target (block 644).

After a determination that a third party attack is not a part of the compromised gaming state (block 642—NO) and/or the attack has been countered (block 644), process 600 may include selecting one or more compensating efficiency (block 650) and applying the one or more compensating efficiency (block 660). For example, gaming equality system 150 may determine that deliberate actions taken directly by one or more participant result in an unfair competitive advantage over other gaming participants.

Process 600 may further include logging the dynamic performance management actions performed during the active gaming session (block 670), notifying the gaming host and/or opponents of the gaming state and/or counter-actions taken, and updating a user rating system (block 690). For example, gaming equality system 150 may generate notifications and/or store information in user and/or end device profiles, as well as KPI information and gaming information (e.g., duration of play, scores/levels reached, cheating methodologies, compensating efficiencies used/effectiveness.).

Figure 7:
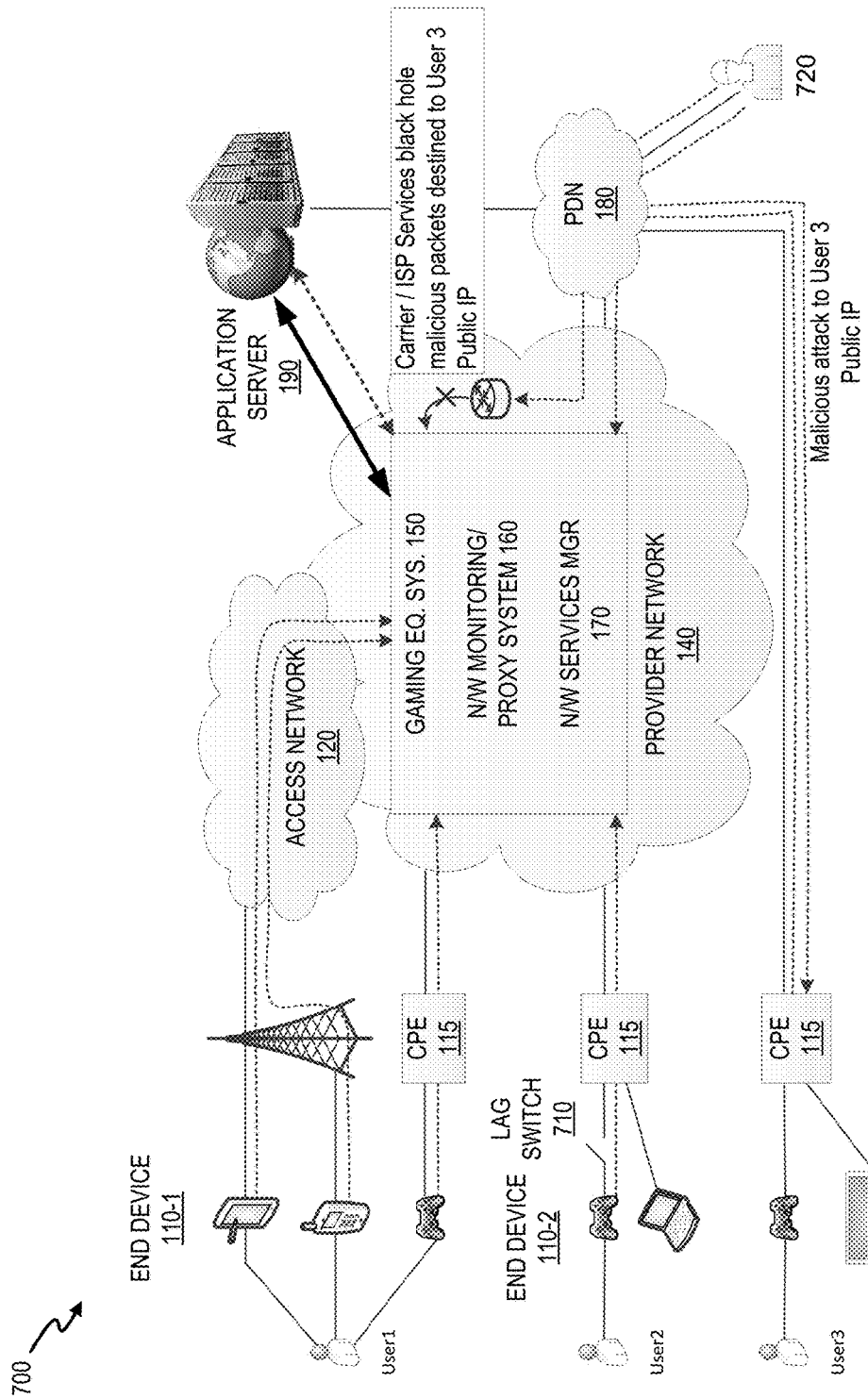
FIG. 7 is a diagram illustrating an exemplary implementation of the gaming equality system described herein.

FIG. 7 illustrates an example gaming equality solution in an exemplary network environment 700. In the example, User 1, User 2, and User 3, using end devices 110, may be participants in a gaming session hosted by application server 190. Application server 190 may have requested the services of an ISP to ensure that Users 1, 2, 3 have substantially similar network performance for data transmissions made during the gaming session.

In response to the request, the ISP may use gaming equality system 150, network monitoring/proxy system 160, and/or network services manager 170 ("elements 150/160/170") to monitor the gaming traffic generated by and destined for end devices 110. One or more of elements 150/160/170, using KPI data analytics, may determine—within a predetermined degree of certainty—that User 2 is using a lag switch 710 to disrupt upstream data transmissions from end device 110. One or more of elements 150/160/170 may further determine, during the gaming session, that a third party 720 has been engaged (by User 2) to launch DoS attacks on the public IP address of end device 110 of User 3.

Based on these determinations, one or more of elements 150/160/170 may select one or more compensating efficiencies to negate the competitive advantage that lag switch 710 gives User 2 over User 1 and User 3. For example, for User 1, one or more of elements 150/160/170 may provide access to RAN acceleration technologies with respect to Access Network 120 to increase data throughput for end device 110 of User 1 for the gaming data transmissions. For User 3, one or more of elements 150/160/170 may implement least cost routing to increase data throughput for end device 110 of User 3. In addition, one or more of elements 150/160/170 may enable ad hoc security tools to intercept/block DoS packets from third party 720.

One or more of elements 150/160/170 may monitor data transmissions during the gaming session to determine the effectiveness of the compensating efficiencies implemented, and implement other efficiencies throughout the gaming session as necessary. One or more of elements 150/160/170 may log the actions taken and update user/device profiles for Users 1, 2, 3, and third-party 720.

Systems and methods described herein detect deliberately-compromised end-to-end channel capacity/performance that result in an inequality of communication opportunities during an active gaming session. The systems and methods identify factors in KPI data that correlate to end-to-end network conditions (such as jitter), selects compensating efficiencies and/or security measures in response to the network conditions, and implements such efficiencies/security measures to counteract or neutralize the unfair gaming practices. Gaming equality services may be associated with a subscriber service, a per-event service, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described with respect to FIG. 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices. The term "instructions" may include algorithms and/or rules, for example, in a digital format.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
monitoring, by a network device, data communications transmitted in a provider network connecting a first user device to at least one of a second user device or a network-based application provider;
determining, by the network device and based on the monitoring, that the data communications are associated with a user-interactive gaming session;
obtaining, by the network device, current attribute values for the data communications, wherein the current attribute values correspond to key performance indicators;
applying, by the network device, a set of rules that define a plurality of compromised communications states as a function of reference attribute values that correspond to the current attribute values;
evaluating, by the network device, the current attribute values against the set of rules to determine a compromised communications state with respect to the user-interactive gaming session;
determining that the compromised communications state corresponds to a competitive advantage for the first user device; and
implementing, by the network device and based on the competitive advantage, at least one compensating efficiency with respect to the data communications transmitted via the provider network during the user-interactive gaming session.

2. The method of claim 1, wherein the current attribute values correspond to the key performance indicators for the provider network.

3. The method of claim 1, further comprising:
identifying, based on the data communications, a particular application associated with the user-interactive gaming session, wherein the reference attribute values used correspond to the particular application.

4. The method of claim 1, wherein evaluating the current attribute values comprises comparing the key performance indicators associated with the network-based application provider.

5. The method of claim 1, wherein evaluating the current attribute values comprises comparing the key performance indicators associated with the first user device or the second user device.

6. The method of claim 1, wherein the reference attribute values correspond to recorded values from previous user-interactive gaming sessions for at least one of the first user device or the second user device.

7. The method of claim 1, wherein implementing the at least one compensating efficiency comprises optimizing network transmission of the data transmissions of the second user device.

8. A network device comprising:
a communication interface;
a memory configured to store instructions; and
a processor configured to execute the instructions to:
monitor, via the communication interface, data communications transmitted in a provider network connecting a first user device to at least one of a second user device or a network-based application provider,
determine, based on the monitoring, that the data communications are associated with a user-interactive gaming session,
obtain current attribute values for the data communications, wherein the current attribute values correspond to key performance indicators;
apply a set of rules that define a plurality of compromised communications states as a function of reference attribute values that correspond to the current attribute values;
evaluate the current attribute values against the set of rules to determine a compromised communications state with respect to the user-interactive gaming session;
determine that the compromised communications state corresponds to a competitive advantage for the first user device; and
implement, based on the competitive advantage, at least one compensating efficiency with respect to the data communications transmitted via the provider network during the user-interactive gaming session.

9. The network device of claim 8, wherein the current attribute values correspond to the key performance indicators for the provider network.

10. The network device of claim 8, wherein the processor further executes the instructions to:
identify, based on the data communications, a particular application associated with the user-interactive gaming session, wherein the reference attribute values correspond to the particular application.

11. The network device of claim 8, wherein to evaluate the current attribute values, the processor further executes the instructions to compare the key performance indicators associated with the network-based applications host.

12. The network device of claim 8, wherein to evaluate the current attribute values, the processor further executes the instructions to compare the key performance indicators associated with the first user device or the second user device.

13. The network device of claim 8, wherein the reference attribute values correspond to recorded values from previous user-interactive gaming sessions for at least one of the first user device or the second user device.

14. The network device of claim 8, wherein to implement the at least one compensating efficiency the processor further executes the instructions to optimize network transmission of the data transmissions of the second user device.

15. A non-transitory storage medium storing instructions executable by a processor of a network device to:
monitor data communications transmitted in a provider network connecting a first user device to at least one of a second user device or a network-based applications host,
determine, based on the monitoring, that the data communications are associated with a user-interactive gaming session,
obtain current attribute values for the data communications, wherein the current attribute values correspond to key performance indicators;
apply a set of rules that define a plurality of compromised communications states as a function of reference attribute values that correspond to the current attribute values;
evaluate the current attribute values against the set of rules to determine a compromised communications state with respect to the user-interactive gaming session;
determine that the compromised communications state corresponds to a competitive advantage for the first user device; and
implement, based on the competitive advantage, at least one compensating efficiency with respect to the data communications transmitted via the provider network during the user-interactive gaming session.

16. The non-transitory storage medium of claim 15, wherein the current attribute values correspond to the key performance indicators for the provider network.

17. The non-transitory storage medium of claim 15, wherein the instructions are further configured to:
identify, based on the first communications, a particular application associated with the user-interactive gaming session, wherein the reference attribute values correspond to the particular application.

18. The non-transitory storage medium of claim 15, wherein to evaluate the current attribute values, the instructions are further configured to compare the key performance indicators associated with the network-based applications host.

19. The non-transitory storage medium of claim 15, wherein to evaluate the current attribute values, the instructions are further configured to compare the key performance indicators associated with the first user device or the second user device.

20. The non-transitory storage medium of claim 15, wherein the reference attribute values correspond to recorded values from previous user-interactive gaming sessions for at least one of the first user device or the second user device.

* * * * *